United States Patent
Chun et al.

(10) Patent No.: US 8,830,900 B2
(45) Date of Patent: Sep. 9, 2014

(54) METHOD OF EFFECTIVELY USING RADIO RESOURCE IN RELAY NODE OF A WIRELESS COMMUNICATION SYSTEM

(75) Inventors: Sung-Duck Chun, Gyeonggi-Do (KR); Seung-June Yi, Gyeonggi-Do (KR); Sung-Hoon Jung, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 377 days.

(21) Appl. No.: 13/260,447

(22) PCT Filed: Apr. 20, 2010

(86) PCT No.: PCT/KR2010/002467
§ 371 (c)(1), (2), (4) Date: Sep. 26, 2011

(87) PCT Pub. No.: WO2010/123256
PCT Pub. Date: Oct. 28, 2010

(65) Prior Publication Data
US 2012/0033606 A1 Feb. 9, 2012

Related U.S. Application Data

(60) Provisional application No. 61/171,440, filed on Apr. 21, 2009.

(30) Foreign Application Priority Data

Apr. 13, 2010 (KR) .......................... 10-2010-0033990

(51) Int. Cl.
*H04B 7/14* (2006.01)
*H04B 7/155* (2006.01)
*H04W 72/12* (2009.01)
*H04W 84/04* (2009.01)
*H04B 7/26* (2006.01)

(52) U.S. Cl.
CPC ........ *H04W 72/1205* (2013.01); *H04W 84/047* (2013.01); *H04B 7/2606* (2013.01); *H04B 7/15528* (2013.01)
USPC ....................................................... 370/315

(58) Field of Classification Search
CPC . H04B 7/2606; H04B 7/15528; H04W 88/04; H04W 16/26; H04W 84/047; H04W 28/18; H04W 72/1205
USPC .............. 370/310, 315, 328, 351, 389, 395.1, 370/395.2, 395.21, 464, 465; 455/403, 455/422.1, 435.1, 435.2, 435.3, 450, 452.1, 455/452.2, 7, 11.1, 12.1, 13.1, 15, 16
See application file for complete search history.

(56) References Cited

U.S. PATENT DOCUMENTS

2007/0201400 A1    8/2007   Kang et al.
2007/0297450 A1*   12/2007   Smolinske et al. ........... 370/469

(Continued)

FOREIGN PATENT DOCUMENTS

KR     1020080034263       4/2008

*Primary Examiner* — Obaidul Huq
(74) *Attorney, Agent, or Firm* — Lee, Hong, Degerman, Kang & Waimey

(57) ABSTRACT

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS), a Long Term Evolution (LTE) system, or a LTE-A (LTE-Advanced) system and more particularly, to a method of effectively using radio resource(s) in relay node, and it may be an object of the present invention to provide an improved method of maintaining a Quality of Service (QoS) and of managing a memory and buffer in a LTE-A system in order to effectively utilize the radio resource(s).

16 Claims, 5 Drawing Sheets

(56) References Cited

U.S. PATENT DOCUMENTS

| | | |
|---|---|---|
| 2008/0013459 A1 | 1/2008 | Do et al. |
| 2009/0252174 A1 * | 10/2009 | Cheng et al. .................. 370/400 |
| 2010/0255773 A1 * | 10/2010 | Halfmann et al. ................ 455/7 |
| 2011/0222428 A1 * | 9/2011 | Charbit et al. ................ 370/252 |

* cited by examiner

R/R/E/LCID/F/L sub-header with 7-bits L field

R/R/E/LCID/F/L sub-header with 15-bits L field

R/R/E/LCID sub-header

US 8,830,900 B2

METHOD OF EFFECTIVELY USING RADIO RESOURCE IN RELAY NODE OF A WIRELESS COMMUNICATION SYSTEM

CROSS-REFERENCE TO RELATED APPLICATIONS

This application is the National Stage filing under 35 U.S.C. 371 of International Application No. PCT/KR2010/002467, filed on Apr. 20, 2010, which claims the benefit of earlier filing date and right of priority to Korean Application No. 10-2010-0033990, filed on Apr. 13, 2010, and also claims the benefit of U.S. Provisional Application No. 61/171,440 filed on Apr. 21, 2009, the contents of which are all hereby incorporated by reference herein in their entirety.

TECHNICAL FIELD

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS), a Long Term Evolution (LTE) system, or a LTE-A (LTE-Advanced) system and more particularly, to a method of effectively using radio resource(s) in relay node.

BACKGROUND ART

FIG. 1 shows a network structure of the E-UMTS, a mobile communication system, applicable to the related art and the present invention. The E-UMTS system has been evolved from the UMTS system, for which the 3GPP is proceeding with the preparation of the basic specifications. The E-UMTS system may be classified as the LTE (Long Term Evolution) system.

The E-UMTS network may be divided into an evolved-UMTS terrestrial radio access network (E-UTRAN) and a core network (CN). The E-UTRAN includes a terminal (referred to as 'UE (User Equipment), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

FIGS. 2 and 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A PDCP layer of the second layer performs a header compression function to reduce the size of a header of an IP packet including sizable unnecessary control information, to thereby effectively transmit an IP packet such as IPv4 or IPv6 in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UTRAN.

In general, a terminal (UE) directly communicates with a network (eNB) in a LTE system. However, as a relay node (RN) is introduced in a LTE-A system, the terminal can not directly transmit or receive data with the network. Instead, the data communication must be performed through the relay node. As such, a data transmission delay can be happened due to the introduction of the RN. Further, it is very difficult to maintain a Quality of Service (QoS) in the LTE-A system due to an existence of RN. Further, radio resource(s) can be wasted by an ineffective buffer and memory management in the RN, thereby further degrading the QoS.

DISCLOSURE OF INVENTION

Solution to Problem

Accordingly, an object of the present invention is to provide an improved method of maintaining a Quality of Service (QoS) in a LTE-A system. Further, the object of the present invention is to provide an improved method of managing a memory and a buffer in the LTE-A system.

To achieve this and other advantages and in accordance with the purpose of the present invention, as embodied and broadly described herein, there is provided a method for data transmission by a relay node (RN) in a wireless communication system, the method comprising: receiving, by the relay node, data from a plurality of user equipments; generating, by the relay node, at least one parameter to improve a transmission of the received data to a network; and transmitting the data and the at least one generated parameter to the network.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

Hereinafter, the configuration and operation of preferred embodiments according to the present invention will be described with reference to the accompanying drawings.

Figure 1:
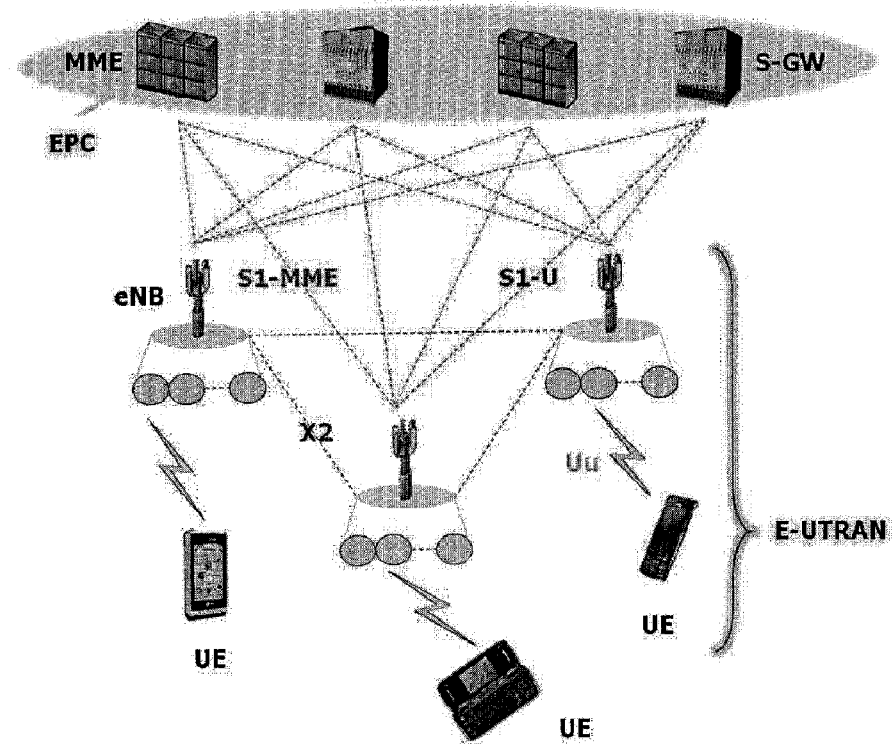
FIG. 1 is a view illustrating a network architecture of E-UTRAN, which is a mobile communication system to which the related art and the present invention are applied.
Figure 2:
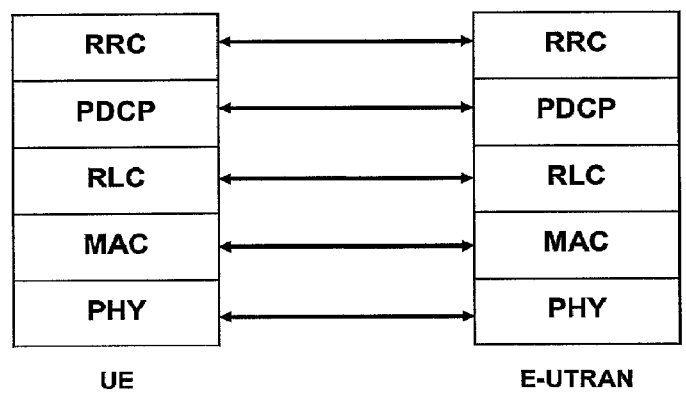
FIG. 2 is an exemplary view illustrating a control plane architecture in a radio interface protocol between UE and E-UTRAN in the related art.
Figure 3:
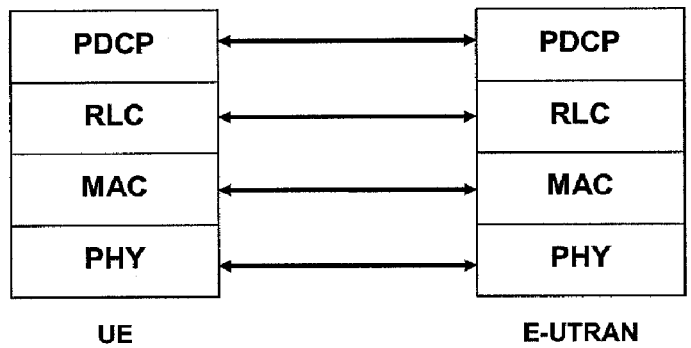
FIG. 3 is an exemplary view illustrating a user plane architecture in a radio interface protocol between UE and E-UTRAN in the related art.
Figure 4:
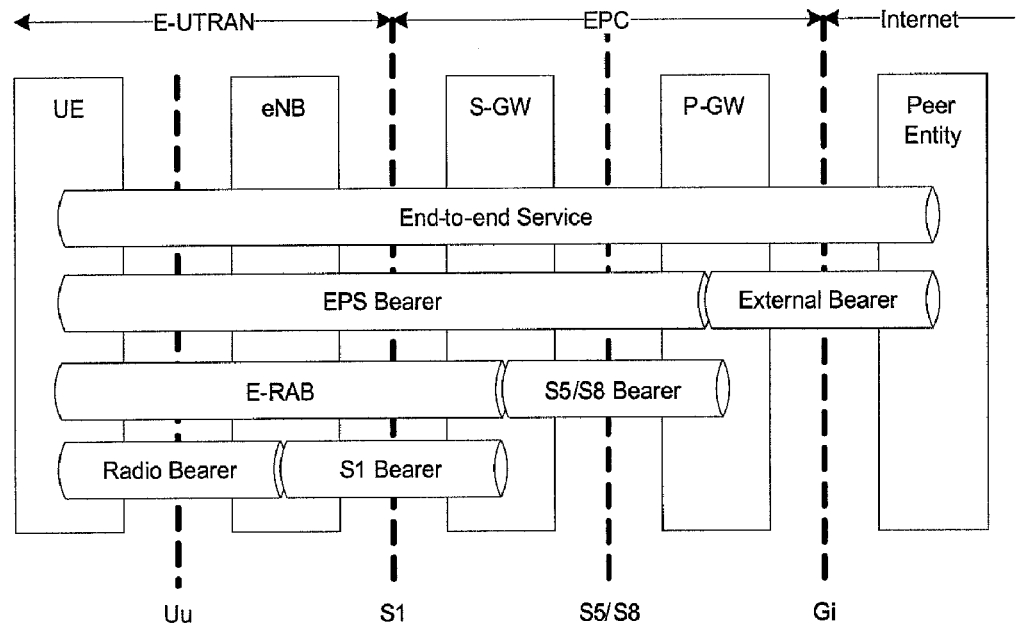
FIG. 4 is an exemplary view illustrating a bearer service structure of a LTE system.

First, a bearer service architecture of the LTE system will be described. FIG. 4 is an exemplary view illustrating a bearer service architecture of the LTE system. Typically, Radio Bearer is a bearer provided in a Uu interface to support the user's service. In 3GPP, each bearer is defined for each interface as illustrated therein to guarantee independence between those interfaces. Specifically, bearers provided by LTE system are commonly called an Evolved Packet System (EPS) bearer, which can be divided into Radio Bearer, S1 Bearer, and the like, for each interface as illustrated in FIG. 4.

In FIG. 4, Packet Gateway (P-GW) is a network node for connecting between the LTE network and another network, and EPS Bearer provided by the LTE system is defined between UE and P-GW. The EPS Bearer is subdivided between individual nodes of the LTE system, and defined as Radio Bearer between UE-eNB, S1 Bearer between eNB-S-GW, and S5/S8 Bearer between S-GW and P-GW. Each bearer is defined through quality of service (QoS), and the QoS may include data rate, error rate, delay, and the like.

Accordingly, QoS that should be totally provided by an LTE system is defined as a EPS bearer, and then each QoS is determined for each interface, and the bearer is set for each interface according to the QoS that should be provided by itself. Since the bearer of each interface is provided by dividing a total EPS bearer into sections, the EPS bearer and other bearers, such as Radio Bearer, S1 Bearer, and the like are all one-to-one relationships.

Hereinafter, a Long-Term Evolution Advanced (LTE-A) system will be described. The LTE-A system is a system that has been developed from an LTE system to meet IMT-Advanced conditions, which are the fourth generation mobile communication conditions recommended by the International Telecommunication Union-Radiocommunication Sector (ITU-R). At present, the LTE-A system standard is actively under development by 3GPP that has developed the LTE system standard. Representative technologies newly added in the LTE-A system mi carrier aggregation technology for extending a used bandwidth to be flexibly used, and relay technology for increasing coverage, supporting group mobility, and allowing network arrangement.

Figure 5:
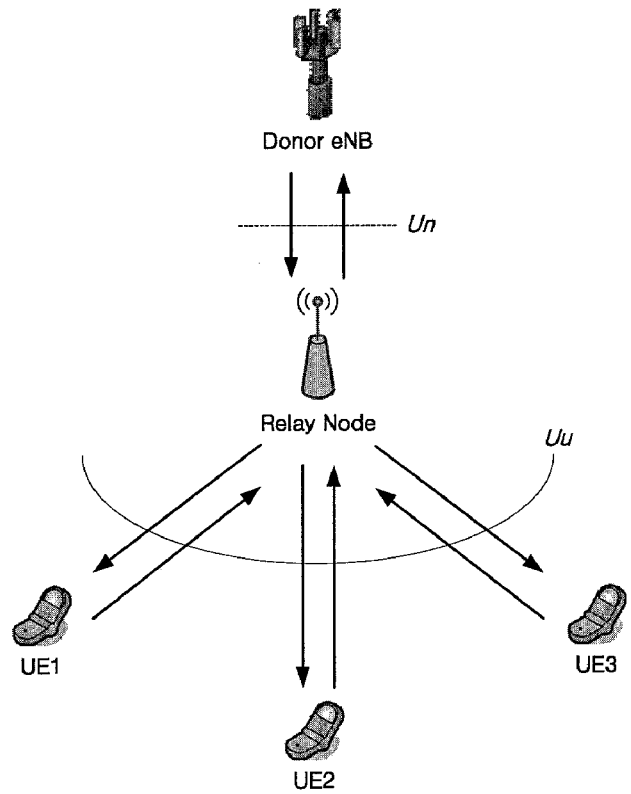
FIG. 5 is an exemplary view illustrating a Relay Node (RN) network structure in a LTE-A (LTE-Advanced) system.

Here, relay is a technology for relaying data between a user equipment (EU) and an Evolved Node B (eNB, base station). Since communication is not smoothly implemented in case where a distance between UE and eNB is far in the LTE system, it is introduced in an LTE-A system as a method of making up for the problem. A new network node, which is referred to as Relay Node (RN), is introduced between UE and eNB to perform such a relay operation, wherein the eNB for managing RN is called Donor eNB (DeNB). In addition, an interface between RN-DeNB that has been newly added due to RN is defined as an Un interface, thereby being differentiated from a Un interface that is an interface between UE and a network node. FIG. 5 illustrates such a concept of Relay Node and an Un interface.

Here, the RN serves to manage UE in behalf of the DeNB. In other words, from a standpoint of the UE, the RN is shown as DeNB, and therefore, MAC/RLC/PDCP/RRC, which is an Uu interface protocol that has been used in a conventional LTE system, are used as they are in a Uu interface between UE-RN.

From a standpoint of the DeNB, the RN may be shown as UE or shown also as eNB according to circumstances. In other words, when the RN is first accessed to the DeNB, it is accessed through random access like UE because the existence of the RN is unknown to the DeNB, but operated like eNB managing UE connected to itself after the RN is once accessed to the DeNB. Accordingly, along with the Uu interface protocol, the functions of the Un interface protocol should be also defined as in the form to which a network protocol function is also added. For the Un interface protocol, discussions as to which functions should be added or changed to each protocol layer on the basis of Uu protocols such as MAC/RLC/PDCP/RRC are still in progress in 3GPP.

Figure 6:
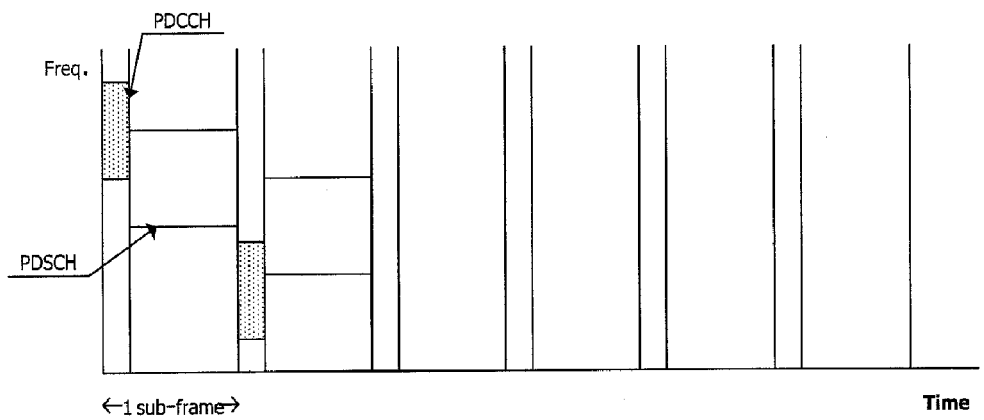
FIG. 6 is an exemplary view illustrating a method of receiving data in downlink.

With reference to FIG. 6, a method for the mobile terminal in an LTE system to receive downlink data will be explained.

On the downlink, there are basically two types of physical channels: PDCCH and PDSCH. The PDCCH is not directly related to transmitting user data, but used in transmitting control information needed for implementing (or using) physical channels. In more basic terms, it can be said that the PDCCH is used in controlling other physical channels. In particular, the PDCCH is used in transmitting information necessary for the mobile terminal to receive the PDSCH. With respect to data that is transmitted at a particular point in time using a particular frequency bandwidth, information about what mobile terminal such data is intended for, the size of such data being transmitted, and the like is transmitted via the PDCCH. Accordingly, each mobile terminal receives the PDCCH at a particular time (e.g., TTI: transmission time interval) and checks whether any data (that should be received) was transmitted. If there is an indication that data (which should be received) was indeed transmitted, the PDSCH is additionally received by using the information (such as the appropriate frequency, etc.) indicated by the PDCCH. It can be said that information indicating as to what mobile terminal (i.e. a single UE or multiple UEs) the data of the PDSCH is being transmitted to, information indicating how the mobile terminal(s) should receive and decode the PDSCH data, and the like are transmitted via a physical channel, i.e. the PDCCH (Physical Downlink Control CHannel).

For example, in a particular sub-frame, let us assume that radio resource information A (e.g. frequency location), transmission format information B (e.g. transmission block size, modulation and coding information, etc.), and RNTI (Radio Network Temporary Identity) information C undergo CRC (Cyclic Redundancy Check) masking and transmitted via the PDCCH. One or more mobile terminals in a corresponding cell use the RNTI information that it has in order to monitor the PDCCH, and referring to the above assumption, for a mobile terminal having RNTI information C, when the PDCCH is decoded, CRC errors do not occur. Accordingly, such mobile terminal uses the transmission format information B and radio resource information A to decode the PDSCH in order to receive data. In contrast, with respect to the above assumption, in a mobile terminal that does not have RNTI information C, CRC errors occur when the PDCCH is decoded, and thus such mobile terminal does not receive the PDSCH.

Through the above procedures, in order to inform about which mobile terminals have been allocated radio resources, a RNTI (Radio Network Temporary Identifier) is transmitted via each PDCCH, and such RNTI can be classified as a dedicated RNTI or a common RNTI. A dedicated RNTI is allocated to a single mobile terminal and is used for transmitting and receiving data corresponding to that mobile terminal. Such dedicated RNTI is only allocated to those mobile terminals having their information registered in the base station (eNB). In contrast, a common RNTI is used by those mobile terminals that do not have their information registered in the base station (eNB) and cannot be allocated a dedicated RNTI, in order to send and receive data with the base station or used for transmitting information (such as system information) that is commonly applied to a plurality of mobile terminals.

As mentioned above, a base station and a terminal construct the E-UTRAN. Radio resources within one cell may be composed of uplink radio resource and downlink radio resource. The base station manages allocation and control of the uplink and downlink radio resources of the cell. That is, the base station determines which radio resource is to be used for which terminal with time information. For example, the base station may determine to allocate a frequency in the range of 100 MHz to 101 MHz to a user 1 after 3.2 seconds, for a downlink data transmission for 0.2 seconds. After the determination, the base station informs the corresponding terminal of such information, such that the terminal can receive the downlink data. Similarly, the base station may determine when and which terminal is allowed to transmit uplink data using how many and which radio resources. The base station may then inform the corresponding terminal of the determination such that the terminal can transmit the uplink data using the radio resources for the corresponding time.

Unlike the related art, the dynamic management of radio resources by the data station allows the efficient use of radio resources. The related art technique is configured such that one terminal keeps using one radio resource during a call connection. This technique is irrational, considering that many services are recently provided based upon an internet protocol (IP) packet. It is because most packet services do not continuously generate packets during a call connection but contain non-transmission intervals during the call connection. In spite of this, the continuous allocation of radio resources to one terminal is inefficient. To solve the problem, the E-UTRAN system employs the aforesaid method for allocating a radio resource to a terminal, while service data exists, only when the terminal needs the radio resource.

In more detail, in order to efficiently use radio resources in the LTE system, the base station should know what kind of data and how many data each user wants to send. For downlink data, it is transferred from an access gateway to the base station. The base station thus knows how many downlink data should be transferred to each user. On the other hand, for uplink data, if a terminal does not inform the base station of information related to uplink data that it wants to send, the base station cannot know how many uplink data each terminal needs. Hence, in order for the base station to appropriately allocate uplink radio resources to terminals, each terminal should provide the base station with information required for scheduling radio resources.

To this end, a terminal informs to the base station if it has data to send, and the base station sends a radio resource allocation message to the terminal based upon the information.

At the process, namely, when the terminal informs the base station that it has data to send, the terminal informs the base station of the amount of data stored in its buffer, which is called as a buffer status report (BSR).

However, the BSR is generated in the format of a MAC control element (MAC CE) and included in a MAC PDU to be transmitted from the terminal to the base station. That is, an uplink radio resource is required for the BSR transmission, which means that uplink radio resource allocation request information for the BSR transmission should be sent. When the BSR is generated, if there is an uplink radio resource allocated, the terminal immediately sends the BSR using the uplink radio resource. However, when the BSR is generated, if there is no uplink radio resource allocated, the terminal performs a scheduling request (SR) procedure (i.e., resource allocation request procedure).

The SR procedure may be divided into two ways, namely, a method using a dedicated scheduling request (D-SR) channel set for a physical uplink control channel (PUCCH) and a method using a RACH procedure. That is, once the SR procedure is triggered, if the terminal has an allocated D-SR channel, then the terminal uses the D-SR channel to send a radio resource allocation request. If the terminal does not have the D-SR channel allocated thereto, then the terminal starts the RACH procedure. In case of using the D-SR channel, the terminal sends a radio resource request allocation signal on uplink via the D-SR channel. The SR procedure may be continuously performed until the terminal is allocated with a UL-SCH resource.

In LTE system, a HARQ operation is performed in a MAC (Medium Access Control) layer for an effective data transmission. The following is a detailed description of the HARQ operation.

Figure 7:
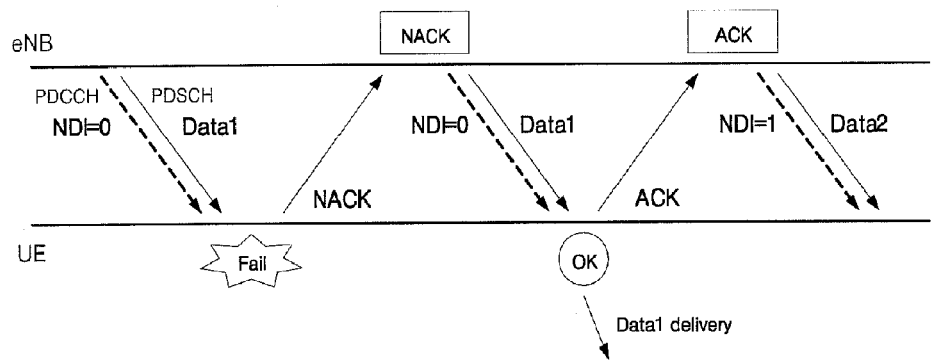
FIG. 7 is an exemplary view illustrating a procedure for a HARQ operation in a MAC layer of LTE system.

FIG. 7 is an exemplary view showing a HARQ operation method for an effective data transmission. As illustrated in FIG. 7, a base station (or eNB) may transmit downlink scheduling information (referred as 'DL scheduling information' hereafter) through a PDCCH (Physical Downlink Control Channel) in order to provide data to a terminal (UE) during a HARQ operation. The DL scheduling information may include a UE identifier (UE ID), a UE group identifier (Group ID), an allocated radio resource assignment, a duration of the allocated radio resource assignment, a transmission parameter (e.g., Modulation method, payload size, MIMO related information, etc), HARQ process information, a redundancy version, or a new data indicator (NID), etc.

Here, the DL scheduling information may be transmitted through a control channel such as a PDCCH, and the DL scheduling information may be varied with a channel conditions or circumstances. For example, if a current channel condition is better than a channel condition of an initial transmission, higher bit rate may be used by manipulating a modulation scheme or a payload size. In contrast, if a current channel condition is worst than a channel condition of an initial transmission, lower bit rate may be used.

The terminal checks the DL scheduling information by monitoring a PDCCH in every TTI. Then, the terminal receives data through a PUSCH based on the DL scheduling information. Once the terminal receives the data, the received data is stored in a soft buffer, and then the terminal attempts to decode the stored data. If the terminal successfully decodes the data, the terminal transmits an ACK signal to the base station. If the terminal does not successfully decode the data, the terminal transmits a NACK signal to the base station. After that, if the base station receives the ACK signal from the terminal, the base station transmits a next data with an assumption that previous data transmission was successfully performed. If the base station receives the NACK signal, the base station retransmits same data with a same transmission format or a different transmission format. After the NACK signal is transmitted to the base station by the terminal, the terminal transmitted the NACK signal would expect to receive a retransmission of the data. Here, the value in the NDI (New Data Indicator) field contained in the PDCCH may be used for the UE to determine whether the received data is an initial transmission data or a retransmitted data. More specifically, the NDI field is 1 bit field that toggles every time a new data is transmitted or received. (0→1→0→1→ . . . ) As such, the value in the NDI for the retransmitted data always has a same value used in an initial transmission. From this, the UE may know an existence of retransmitted data by comparing these values.

In LTE system, a synchronous HARQ is employed for the uplink direction (from terminal to base station). Here, the synchronous HARQ refers to a technique where the time interval for each data transmission is the same. Namely, when the terminal should perform retransmission after an original transmission, such retransmission occurs at a certain time after the original transmission. As such, using the same time interval reduces any waste of radio resources that would be needed if scheduling information is transmitted using the PDCCH at various different retransmission points of time, and also results in a decrease in situations where the terminal cannot perform appropriate retransmissions because the PDCCH was not properly received.

In such synchronous HARQ procedure, values indicating the maximum number of transmissions and the maximum number of retransmissions are used.

The maximum number of transmissions is a value that is one greater than the maximum number of retransmissions (i.e. Max. # of re-Tx=Max. # of Tx+1), and both values have the same purpose. Namely, these values indicate the maximum number of times that a particular data block can be transmitted (or retransmitted) through HARQ. A maximum number of retransmissions is provided in order to minimize the delays or bottleneck in transferring data that would occur if retransmissions were unlimited, and to consider the mobile communications environment that requires sharing of radio resources among multiple users.

If the terminal receives a NACK signal from the base station with respect to its original transmission, retransmissions are performed and if the maximum number of retransmissions is reached (but still unsuccessful), further transmission of the corresponding data is stopped and such data is deleted from the buffer.

Figure 10:
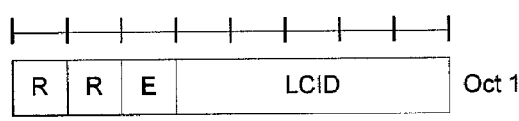
FIG. 10 is an another exemplary view illustrating a MAC sub-header format used in the MAC entity.
Figure 11:
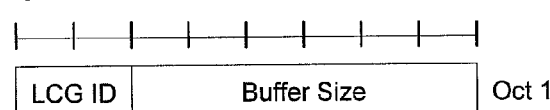
FIG. 11 is an exemplary view illustrating a short BSR and a truncated BSR of MAC control element.

The structure of the MAC PDU (Medium Access Control Protocol Data Unit) used for a MAC entity will now be described. FIG. 10 shows a format of the MAC PDU used for the MAC entity. In FIG. 10, an LCID informs to which logical channel a corresponding MAC SDU corresponds, and 'L' field informs about the size of the corresponding MAC SDU. An 'E' field informs whether or not there are additional headers. In the process, if the size of the corresponding MAC SDU or a MAC control element is larger than 127, the 'L' field of 15 bits is used. For a MAC sub-header with respect to the MAC SDU included in a MAC PDU or for a size-fixed MAC control element, a MAC sub-header in the form as shown in FIG. 10 is used. For other cases, a MAC sub-header in the form as shown in FIG. 11 is used.

Figure 8:
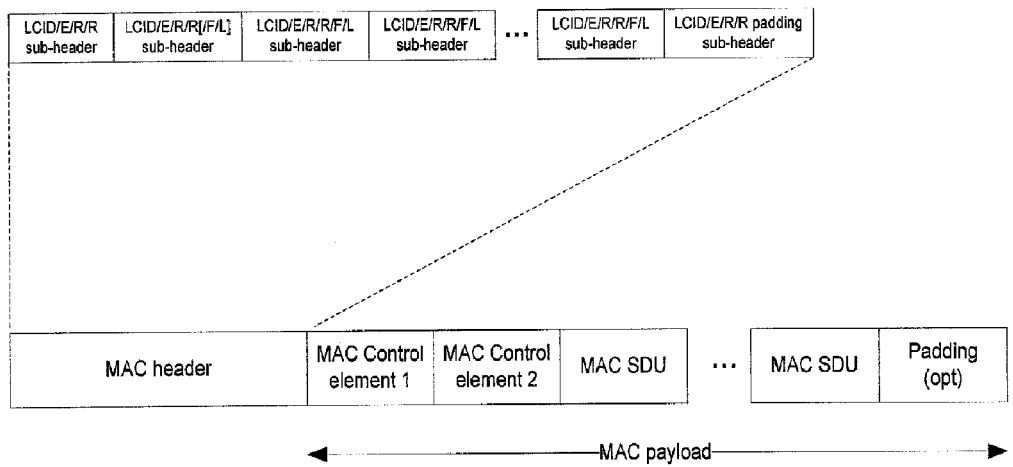
FIG. 8 is an exemplary view illustrating a PDU format used in a MAC entity.
Figure 9:
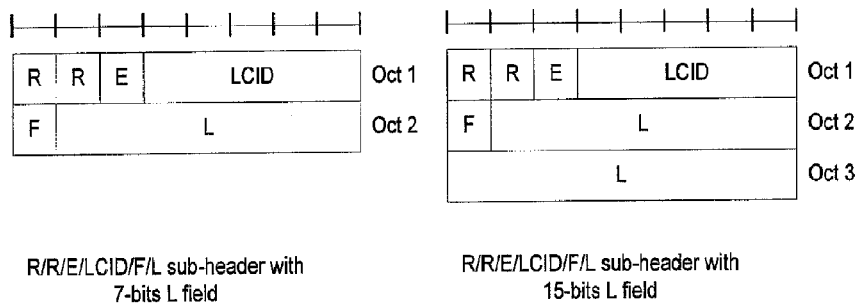
FIG. 9 is an exemplary view illustrating a MAC sub-header format used in the MAC entity.

Each field as used in FIG. 8-10 will now be described in detail as follows.

LCID: It informs about a logical channel to which a corresponding MAC SDU belongs, or which information a corresponding MAC CE (MAC Control Element) includes.

E: It informs about whether or not there is another MAC sub-header after the current MAC sub-header.

F: It informs about the length of a subsequent 'L' field.

R: It is a reserved bit which is not in use.

Here, information about the values used for the LCID may be shown as the below tables.

TABLE 1

LCID values for DL-SCH

| Index | LCID values |
|---|---|
| 00001-xxxxx | identity of the logical channel |
| xxxxx-11011 | Reserved |
| 11100 | UE Contention Resolution Identity |
| 11101 | Timing Advance |
| 11110 | DRX Command |
| 11111 | Padding |

TABLE 2

LCID values for UL-SCH

| Index | LCID values |
|---|---|
| 00000-yyyyy | Identity of the logical channel |
| yyyyy-11011 | Reserved |
| 11100 | Power Headroom Report |
| 11101 | Short Buffer Status Report |
| 11110 | Long Buffer Status Report |
| 11111 | Padding |

Figure 12:
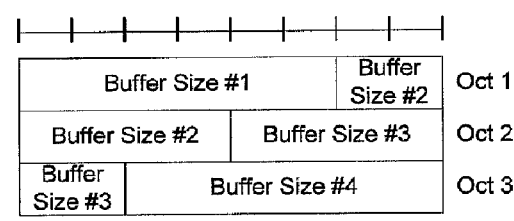
FIG. 12 is an exemplary view illustrating a long BSR of MAC control element.

FIGS. 11 and 12 illustrate BSR (Buffer Status Report) formats. Specifically, FIG. 11 is an exemplary view illustrating a short BSR and a truncated BSR of MAC control element and FIG. 12 is an exemplary view illustrating a long BSR of MAC control element. The short BSR or long BSR is selectively used based on a number of logical channel group having the data and a size of available space in the MAC PDU.

Figure 13:
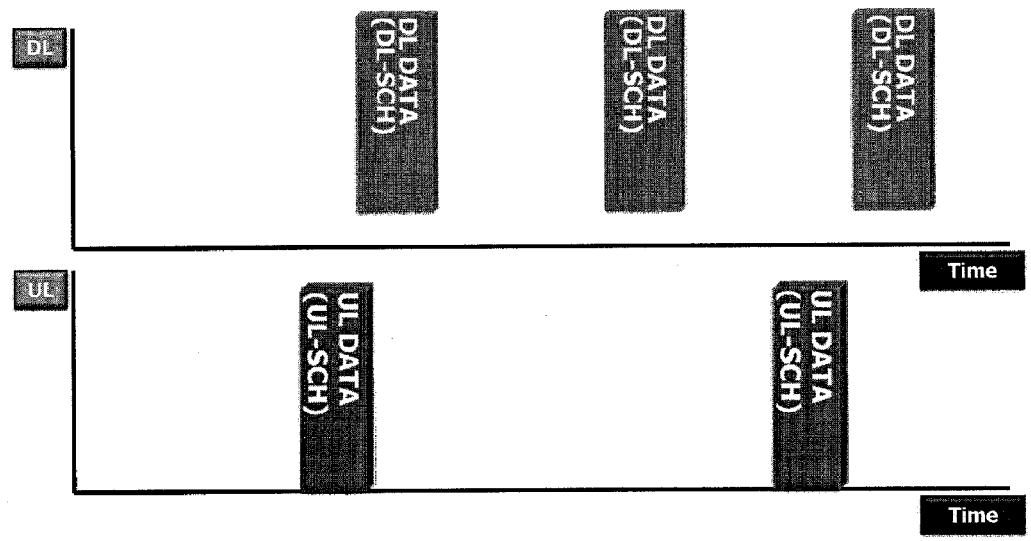
FIG. 13 is an exemplary view illustrating a semi-persistent radio resource scheduling.

A semi-persistent scheduling (or a semi-persistent radio resource allocation method) or semi-permanent scheduling (or a semi-permanent radio resource allocation method) will now be described. FIG. 13 is an exemplary view illustrating a semi-persistent radio resource scheduling.

In general, the UE transmits data to the base station through the process including: 1) the UE requests radio resources required for transmitting generated data from the base station, 2) the base station allocates radio resources through a control signal according to the UE request for radio resources, and 3) the UE transmits the data to the base station through the allocated radio resources. However, in the VoIP service, in general, small packets of uniform size are frequently and regularly transmitted. So, the effective radio resource allocation scheme can be applied in consideration of such characteristics. Namely, the semi-permanent scheduling is also one of radio resource allocation schemes optimized for a VoIP service. In this method, transmission of information regarding allocation of radio resources is omitted. In more detail, when VoIP starts, A packet size and period of RTP are previously determined and radio resources are permanently allocated. Accordingly, the UE may immediately perform the process of transmitting data without the first and second steps, namely, without the radio resource requesting step and the radio resource allocation step, as mentioned above, according to such setting of resource resources. That is, in the semi-persistent scheduling, there is no need to transmit radio resource allocation information via a PDCCH. Without receiving the PDCCH each time, the UE can periodically receive particular radio resources or transmit data by using particular radio resources according to pre-set information.

Figure 14:
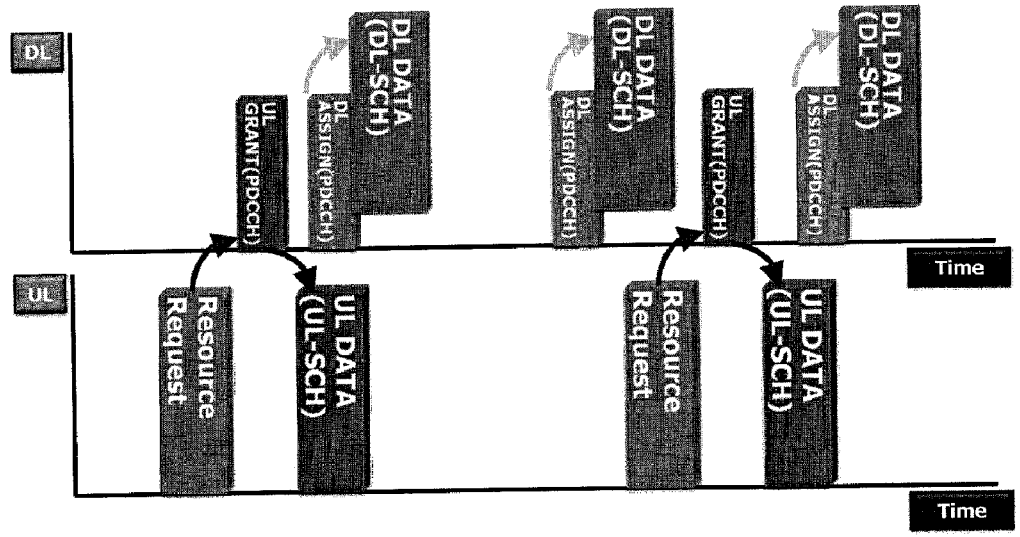
FIG. 14 is an exemplary view illustrating a dynamic radio resource scheduling.

Meanwhile, the dynamic scheduling is a method for informing about radio resources to be received or to be transmitted by the UE each time. FIG. 14 is an exemplary view illustrating a dynamic radio resource scheduling. The base station may selectively set a dedicated scheduling request channel (D-SR Channel) for the UE. The D-SR channel may transmit 1-bit information at uniform time intervals.

As aforementioned, a terminal (UE) directly communicates with a network (eNB) in a LTE system. However, as a relay node (RN) is introduced in a LTE-A system, the terminal can not directly transmit or receive data with the network. Instead, the data communication must be performed through the relay node. As such, a data transmission delay can be happened due to the introduction of the RN.

In the LTE-A system, the relay node (RN) and the DeNB generally uses a semi-persistent radio resource allocation method. Namely, the DeNB allocates radio resource(s) to the RN by using of the semi-persistent radio resource allocation method. If the RN has data to be transmitted, the RN may use the allocated radio resource to transmit the data.

In the LTE-A system, as described above, the DeNB provides a service to terminals via the relay node. Further, the DeNB provides a service to terminals that are directly connected to the DeNB. Namely, if an amount of the allocated radio resource to the RN is more than a necessary amount of the radio resource, this may cause a radio resource shortage for those terminals directly connected to the DeNB. Further, because of such radio resource shortage, a quality of service provided to the terminal may be degraded.

The relay node performs both operations of the terminal (UE) and the base station (DeNB). In general, the data transmitted to the terminal is eventually discarded by terminal's applications if the data is no longer needed. Likewise, the data transmitted from the terminal to the DeNB, will be eventually discarded after its use. However, in the relay node, all successfully received data from the terminal and the base station should not be discarded. Rather, the successfully received data should be safely stored in the RN until the RN transmits the received data to the terminal or the DeNB. Therefore, if a memory or a buffer of the RN is full, the received data from the terminal or the DeNB has to be discarded as there is not enough space for a storing. This may be very problematic in the LTE-A system.

In order to solve these problems, the present invention provide a method of effectively allocating radio resource(s) in the relay node and the DeNB and a method of receiving a good quality of service in an optimized manner.

According to the present invention, the relay node (RN) may notify a total number of terminals to the DeNB such that the DeNB can allocate an appropriate amount of the radio resource(s) to the RN. Here, the terminals may only refer to those terminals receiving data transmission service using a semi-persistent radio resource allocation.

As the semi-persistent radio resource allocation method is commonly used for a voice communication, an amount of radio resource(s) allocated in the DeNB and the RN should be proportional to a number of terminal that are currently used for the voice communication. As such, among those terminals directly connected to the RN, if the number of terminals that currently used for the voice communication is decreased, the amount of allocated radio resource(s) for the semi-persistent radio resource allocation method in the RN and the DeNB, should be also decreased. Likewise, if the number of terminals that currently used for the voice communication is increased, the amount of allocated radio resource(s) for the semi-persistent radio resource allocation method in the RN and the DeNB, should be also increased. Therefore, if the RN notifies information related to the terminal using the allocated radio resource(s) through the semi-persistent radio resource allocation method setting between the RN and the DeNB, the DeNB may allocate a proper amount of the radio resource(s).

Furthermore, the relay node (RN) may also notify a number of radio bearer(s) to the DeNB. Here, the radio bearer(s) may refer to those radio bearers used only for the semi-persistent radio resource allocation method. Also, the RN may notify a number of users currently using the voice communication. Also, the RN may notify information related to a bit rate of a service provided to the terminal using the allocated radio resource(s) through the semi-persistent radio resource allocation method. Here, the information related to the bit rate may be a maximum bit rate (or summation of the maximum bit rates) of the service using the radio resource(s) through the semi-persistent radio resource allocation method. Or, the information related to the bit rate may be a guaranteed bit rate (or summation of the guaranteed bit rates) or a minimum bit rate (or summation of the minimum bit rates).

Further, during the above procedure, the RN may notify information related to a bit rate that satisfies a quality of services provided to the terminal using the allocated radio resource(s) through the semi-persistent radio resource allocation method. Also, the RN may notify information indicating a specific amount of radio resource(s) that should be allocated. And, a specific time period used in the semi-persistent radio resource allocation method may be also notified to the DeNB. In addition, if a certain condition is satisfied, the RN may request the DeNB to increase or decrease the radio resource(s) allocated by the semi-persistent radio resource allocation method. Here, the certain condition may be satisfied if the number of terminals is greater than a threshold value. Or, the certain condition may be satisfied if the number of terminals is less than the threshold value. Or, certain condition may be satisfied if a gap between the amount of radio resource(s) required for receiving a good quality of service and an actual amount of radio resource(s) allocated by the semi-persistent radio resource allocation method, is greater than a threshold value.

In general, each data has a maximum transmission delay time. Namely, the data generated in a transmitting side entity must be transmitted to a receiving side entity within the maximum transmission delay time. For example, it is assumed that there is a certain data of a terminal 1 of the RN, which has to be transmitted to the DeNB within 1 second. (i.e., maximum transmission delay time=1), if a data transmission time for the data of the terminal 1 from the terminal 1 to the RN is 0.9 second, the data of the terminal 1 must be transmitted from the RN to the DeNB within 0.1 second. Here, if there is another terminal 2 having data to be transmitted to the DeNB within 1 second and if a data transmission time for the data of the terminal 2 takes 0.1 second from the terminal 2 to the RN, the data of the terminal 2 is needed to be transmitted to the DeNB within 0.9 second. In this case, the RN may transmit the data of the terminal 1 with priority as a remaining time for the data of the terminal 1 is less than the data of the terminal 2.

In general, a plurality of RN can be connected to a single DeNB. Among the plurality of RN, If a RN 1 has many data, which were received 1 second before, from the terminals and if a RN 2 has may data, which were received 0.2 second before, from the terminals, the DeNB should allocate more radio resources for the RN 1 such that the data stored in the RN1 can be immediately transmitted to the DeNB.

Therefore, according to the present invention, if there is any urgent data that is to be transmitted by the RN, the RN should notify such data to the DeNB. Further, if there is any data that is close to reach a maximum transmission delay time, the RN should notify such data to the DeNB as well.

Particularly, if the RN receives data from the terminal, the RN may start to operate a timer 1. If the data can not be transmitted to the DeNB before the timer 1 expires, the RN may notify this to the DeNB. Here, a setting value of the timer 1 may be varied according to a characteristic of the data. In alternative method, if the RN receives data from the terminal, the RN may start to operate a timer 2. If the data can not be transmitted to the DeNB before the timer 2 expires, the RN may discard the data, and notify this to the DeNB. Also, according to the present invention, if there is any data that were received before a certain time period from the current time period, the RN may notify such data to the DeNB. Further, according to the present invention, an amount of data received from the terminal by the RN may be calculated in every transmission time interval (TTI), and the calculated amount of received data may be transmitted to the DeNB such that the DeNB can estimate an amount of data stored in the RN and a data generating time. According to the present invention, among those data received by the RN from the terminals, if some of the data is discarded by the RN rather than transmitted to the DeNB, the RN may notify information related to the discarded data. Likewise, among those data received by the RN from the DeNB, if some of data is discarded by the RN rather than transmitted to the terminals, the RN may also notify information related to the discarded data to the DeNB. During this procedure, the RN may additionally notify an amount of the discarded data. When the RN notifies the information to the DeNB, a MAC control element or a specific value of a LCID (Logical Channel ID) may be utilized. Further, when the RN notifies the information to the DeNB, layers of PDCP, RRC, or RLC may be utilized. Further, the D-SR channel may be utilized for notifying the information to the DeNB by the RN. Additionally, at least one of QoS information, UE information, priority information, data generating time information, and data remaining transmission time information for each data may be utilized when the RN notifies the information to the DeNB.

In order to effectively manage a buffer or a memory in the RN during a data relaying procedure, according to the present invention, the RN may notify information related to a buffer capability or memory information to the DeNB. Here, the buffer capability may refer to a maximum buffering capability of the RN, and the memory information may refer to an amount of memory installed in the RN or may refer to a number of memory that can be used to store the data in RN. During this procedure, the information may indicate a certain level of the buffer capability (or memory information) designated for each of the Un interface and Uu interface. Further, the information may indicate a certain level of the buffer capability (or memory information) designated for a data transmission between the DeNB and RN and for a data transmission between the RN and the terminal. Further, the information may indicate a certain level of the buffer capability (or memory information) designated for an uplink data transmission and for a downlink data transmission. Here, instead of transmitting the information directly to the DeNB, the RN may transmit the information to a core network. In this case, the core network may notify the received information to the DeNB.

The present invention may provide a method for avoiding unnecessary data transmission from the DeNB to the RN when the memory of the RN is fully occupied. As such, according to the present invention, if a certain event (i.e., buffer or memory of the RN is fully occupied) is happened, the RN may notify such event to the DeNB. Here, the certain event may refer to a situation when the buffer or memory of the RN is fully occupied or when the buffer or memory is occupied more than a threshold. The threshold may be set as a certain ratio (i.e., occupied ratio) or an absolute value, and the threshold may be notified to the RN from the DeNB as a setting value. For example, if the buffer of the RN is occupied more than 80%, the RN may notify this to the DeNB. After receiving such notification from the RN, the DeNB may terminate a data transmission or may reduce an amount of data transmission to the RN. Further, the certain event during the above procedure may refer to a situation when a usage of the buffer or memory of the RN is below a threshold. This threshold may be also set as a certain ratio (i.e., occupied ratio) or an absolute value, and the threshold may be notified to the RN from the DeNB as a setting value. For example, if the usage of the buffer of the RN becomes below 80% from the above 80%, the RN may notify this to the DeNB. After receiving such notification from the RN, the DeNB may start the data transmission or may increase the amount of data transmission to the RN. Furthermore, the certain event may refer to a situation when an accumulated amount of data stored in the buffer or memory of the RN is more than or less than a threshold. For example, if the accumulated data stored in the buffer of the RN increases in every 1 MB (Mega Byte), the RN may notify this to the DeNB. After receiving such notification from the RN, the DeNB may control the amount of data transmission to the RN. Here, the notification from the RN to the DeNB may be transmitted through at least one of a MAC control element, a RRC message, a PDCP status report, and a RLC status report. Furthermore, such notification may be transmitted by using a physical channel such as a D-SR channel. Namely, if an emergency situation is happened, a specific field of the physical channel may be set as '1', and the specific field of the physical channel may be set as '0' for a normal situation.

During the above procedure, radio resource(s) should be allocated to the RN by the DeNB in order to transmit data from the RN to the DeNB. Namely, the DeNB may need to receive a buffer status report (BSR) from the RN in order to allocate the radio resource(s) to the RN. Here, the BSR may be stored in the RN, and the BSR may include information related to an amount of data that should be transmitted to the DeNB. Further, the BSR may include information related to a transmitted BSR from the terminal connected to the RN. For example, if a BSR requiring 100 bytes of radio resources is transmitted from the terminal 1 and if a BSR requiring 200 bytes of radio resources is also transmitted from the terminal 2, the RN may transmit a BSR requiring 300 bytes of radio resources to the DeNB. Here, the BSR may be configured for each of the terminals that connected to the RN, or the BSR may be configured after combining all of received BSR from the terminals. Furthermore, the BSR may be configured after classifying all of the received BSR from the terminals. For example, the received BSR may be classified as a quality of service (QoS), a priority, or service type, etc. Also, the classified BSR may be also combined. Also, time information may be also transmitted to the DeNB when the RN transmits the configured BSR to the DeNB. Here, the time information may include at least one of a time for receiving any of information described above, a time for collecting the BSR, a time of generating data in the terminal, and a time for generating the BSR in the RN, etc.

According to the present invention, the RN may receive data from the DeNB, and may relay it to the terminal. In this case, if the DeNB transmits an exceed amount of data to the RN within a short period of time, this may cause a serious problem for a management of the memory in the RN. Therefore, according to the present invention, information indicating an amount of transmitting data from the DeNB, may be notified to the RN. Further, information indicating an amount of data stored in the buffer, may also be notified to the RN. In addition, any of information described above may also be notified to the RN by the DeNB such that an appropriate amount of memory or buffer in the RN can be allocated.

Figure 15:
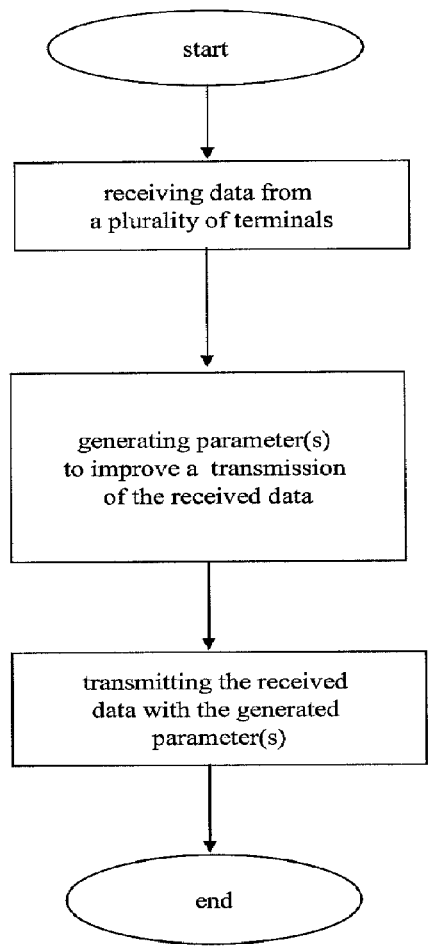
FIG. 15 is an exemplary view illustrating a data transmission procedure by a Relay Node (RN) according to the present invention.

FIG. 15 is an exemplary view illustrating a data transmission procedure by a Relay Node (RN) according to the present invention.

As shown in the FIG. 15, the RN may receive data from the plurality of terminals. After receiving the data, the RN may generate parameter(s) for improving a transmission of the received data. Here, the parameter(s) may be generated by applying the aforementioned exemplary embodiments according to the present invention. After generating the parameter(s), the RN may transmit the received data together with the generated parameter or may transmit the received data separately from the generated parameter.

The present invention may provide a method for data transmission by a relay node (RN) in a wireless communication system, the method comprising: receiving, by the relay node, data from a plurality of user equipments; generating, by the relay node, at least one parameter to improve a transmission of the received data to a network; and transmitting the data and the at least one generated parameter to the network, wherein the at least one parameter indicates a total number of UE or radio bearer that should receive the data transmission, the at least one parameter is related to bit rate information of the data transmission, the bit rate information of the data transmission is at least one of a maximum bit rate, a guaranteed bit rate, and a minimum bit rate for the data transmission, the at least one parameter is related to time information of the data transmission, the time information is a maximum transmission delay time, the at least one parameter is related to a buffer capability or memory information of the relay node, a buffer status reports (BSR) is further transmitted to the network for transmission of the at least one generated parameter, the at least one generated parameter is transmitted to the network using at least one of a MAC control element, a protocol layer, and D-SR (Dedicated-SR) channel, at least one of QoS information, UE information, priority information, data generation time information, and data transmission left time information, is transmitted to the network with the at least one generated parameter, the network is a Donor eNB (DeNB), and the all steps can be applied in a LTE-A (LTE-advanced) system.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for data transmission by a relay node (RN) in a wireless communication system, the method comprising:
   receiving, by the relay node, an allocation of a radio resource based on a semi-persistent scheduling (SPS);
   receiving, by the relay node, data from a plurality of user equipments (UEs);
   generating, by the relay node, at least one parameter to improve a transmission of the received data to a network, the at least one generated parameter including information on specific UEs, data of which are to be transmitted via the radio resource allocated based on the SPS, among the plurality of UEs; and
   transmitting, by the relay node, the data and the at least one generated parameter to the network using the radio resource allocated based on the SPS.

2. The method of claim 1, wherein the information on specific UEs indicates a total number of the specific UEs or a total number of radio bearers of the specific UEs.

3. The method of claim 1, wherein the at least one parameter further includes bit rate information of the data transmission.

4. The method of claim 3, wherein the bit rate information of the data transmission is at least one of a maximum bit rate, a guaranteed bit rate, and a minimum bit rate for the data transmission.

5. The method of claim 3, wherein the bit rate information of the data transmission indicates a summation of bit rates required for the specific UEs, and a summation of guaranteed bit rates required for the specific UEs.

6. The method of claim 1, wherein the at least one parameter further includes time information of the data transmission.

7. The method of claim 6, wherein the time information indicates information on any data that is closed to reach a maximum transmission delay time.

8. The method of claim 6, wherein the time information of the data transmission indicates information on any data that is discarded by the relay node without being transmitted to the network.

9. The method of claim 1, wherein the at least one parameter further includes a buffer capability or memory information of the relay node.

10. The method of claim 9, wherein the buffer capability or memory information of the relay node indicates a buffer capability or memory information for an interface between the relay node and the network and a buffer capability or memory information for an interface between the relay node and the UEs.

11. The method of claim 1, wherein the at least one parameter further includes a buffer status reports (BSR).

12. The method of claim 11, wherein the buffer status reports (BSR) is generated based on summation of all BSRs received from the UEs.

13. The method of claim 1, wherein the at least one generated parameter is transmitted to the network using at least one of a MAC control element, a protocol layer, or D-SR (Dedicated-SR) channel.

14. The method of claim 1, wherein the at least one parameter further includes at least one of QoS information, UE information, priority information, data generation time information, or data transmission left time information, is transmitted to the network with the at least one generated parameter.

15. The method of claim 1, wherein the network is a Donor eNB (DeNB).

16. The method of claim 1, wherein the all steps can be applied in a LTE-A (LTE-advanced) system.

* * * * *